United States Patent

[11] 3,615,728

[72] Inventor Aaron E. Wasserman
  Philadelphia, Pa.
[21] Appl. No. 766,952
[22] Filed Oct. 11, 1968
[45] Patented Oct. 26, 1971
[73] Assignee The United States of America as
  represented by the Secretary of Agriculture

[54] METHOD FOR IMPARTING HICKORY SMOKE COLOR AND FLAVOR TO DRIED YEAST AND OTHER FOOD POWDERS
1 Claim, No Drawings

[52] U.S. Cl.......................................................... 99/229,
  99/96
[51] Int. Cl.......................................................... A23b 1/04

[50] Field of Search............................................ 99/96, 229

[56] References Cited
UNITED STATES PATENTS

| | | | |
|---|---|---|---|
| 1,981,225 | 11/1934 | Freshel.......................... | 99/96 |
| 2,524,718 | 10/1950 | Stark et al..................... | 99/96 X |
| 2,677,614 | 5/1954 | Freshel.......................... | 99/96 |
| 3,106,473 | 10/1963 | Hollenbeck.................. | 99/229 |

*Primary Examiner*—Hyman Lord
*Attorneys*—R. Hoffman and W. Bier

ABSTRACT: Hickory smoke color and flavor are imparted to yeast powder by treating it with hickory smoke components dissolved in a volatile solvent such as diethyl ether or ethanol.

METHOD FOR IMPARTING HICKORY SMOKE COLOR AND FLAVOR TO DRIED YEAST AND OTHER FOOD POWDERS

A nonexclusive, irrevocable, royalty-free license in the invention herein described, throughout the world for all purposes of the United States Government, with the power to grant sublicenses of for such purposes, is hereby granted to the Government of the United States of America.

This invention relates to a process for imparting hickory smoke color and flavor to dried yeast powder and more particularly to a novel process for treating dried yeast powder with a solution containing smoke components dissolved in a volatile solvent.

Hickory-smoked yeast is an intermediate product in the preparation of soups, gravies, baby food, animal feed and other nutriments. In addition to providing these nutritive products with the benefits supplied by yeast, the yeast functions as a carrier and dispenser of the highly desirable hickory smoke flavor.

The usual method of smoking yeast powder is to pass fresh smoke through the yeast as it is tumbled in a rotating drum or other similar type apparatus. The smoke is generated by igniting hickory sawdust and permitting it to smoulder. Such a procedure results in many variations in smoke generation parameters thereby making it difficult to achieve and control of color and flavor in the finished product. Consequently, batches of smoked yeast can vary greatly in color and flavor. Also, if the yeast producer does not have smoking equipment, he has to ship the yeast to another processor to be smoked. This could represent a considerable increase in the overall processing cost.

The present invention eliminates these difficulties and provides the yeast producer with a novel method for making yeast in his own plant without the benefit of a smoke generator or a trained smoke house operator. Furthermore, it provides the yeast producer with the means to achieve good control of the degree of color and smoke flavor.

One object of this invention is to impart a hickory smoke color and flavor to dried yeast products.

Another object of this invention is to produce a dried yeast powder having a desirable, characteristic hickory smoke flavor and aroma without resorting to the conventional smoking procedure.

A further object of this invention is to provide a method for imparting hickory smoke color and flavor to yeast by treating the powder with a solution containing smoke components dissolved in a volatile solvent.

In general, according to this invention hickory smoke color and flavor are imparted to dried yeast powder by treating the powder with a volatile solvent in which smoke components are dissolved.

The solution of smoke components can be prepared from freshly generated smoke or from any commercially available smoke or imitation smoke concentrate.

Liquid smoke solution is prepared by the following procedure: smoke produced in a generator is passed through a trap containing water. The strength and organoleptic properties of the solution are controlled by the length of time smoke is bubbled through the water. Tars, polymerized material, and other undesirable components are removed by filtration after the water solution is allowed to stand for 2 days. As noted above, if a smoke generator or other smoke-producing equipment is not available, the smoke solution can be purchased from commercial sources.

Solvent extracts are prepared by extracting 1 liter of liquid smoke solution with about 400 ml. of a volatile solvent such as diethyl ether in a liquid-liquid extractor. This procedure requires approximately 72 hours, but the period of time can be lengthened or shortened depending on the strength of the extract desired. The solvent fraction can be concentrated by evaporation to give any desired strength of flavor.

Alcohol (ethanol) extracts are more suitable than ether extracts in commercial plant operations and are prepared by mixing the desired volume of alcohol with some of the ether extract, removing the ether at room temperature or at a lower than room temperature if necessary to prevent loss of volatile components. A stream of nitrogen is blown over the mixed alcohol-ether solution until the ether is removed. In the process of preparing alcohol extracts, the volumes of alcohol, of ether extract and of the final solution are variable and are governed by the flavor and colors desired in the alcohol extract.

The following examples serve to illustrate the invention and it is not intended that the invention be limited thereto.

EXAMPLE I

One ml. of diethyl ether extract prepared as previously described was mixed with 20 gms. of yeast and shaken until the ether odor disappeared. Lumps that formed were broken up to allow the smoke components to mix more readily with the yeast. The yeast was stored for 48 hours with occasional agitation and mixing to permit undesirable volatile components to evaporate. The golden-brown colored yeast was intimately mixed with 200 gms. untreated yeast. The entire lot acquired a desirable hickory smoke flavor and a slightly darker tan color than the original yeast. On storage, the aroma and flavor was more evenly distributed as all of the yeast absorbed the smoke components from the treated yeast.

EXAMPLE II

One ml. of diethyl ether extract prepared as previously described was mixed with 20 gms. of yeast and shaken until the ether odor disappeared. Lumps that formed were broken up to allow the smoke components to mix more readily with the yeast. The yeast was then placed in an oven at 90° C. for 18 hours with occasional mixing to expedite the removal of undesirable volatile components. A golden-brown color developed within 20 minutes at a higher temperature. The yeast was then mixed with 200 gms. of untreated yeast to distribute the flavor and color throughout the larger batch.

EXAMPLE III

A slightly darker color and a more pronounced smoky flavor was imparted to the yeast by mixing 200 gms. of yeast with 20 gms. of yeast that had been treated the same as that in example 1 except that 5.0 ml. of diethyl ether extract of smoke solution was used instead of 1.0 ml.

EXAMPLE IV

Six ml. of ehtanol were mixed with 2.0 ml. of diethyl ether extract of smoke solution. A stream of nitrogen was blown over the mixture until the ether was removed. Five ml. of the resultant ethanol solution was mixed with 20 gm. of yeast producing a mustard yellow brown yeast that developed a desirable smoky flavor on overnight storage at room temperature. This 20 gm. of yeast was then mixed with 200 gm. of untreated yeast. After several days storage at room temperature the desirable hickory smoke flavor and color was distributed throughout the whole batch.

EXAMPLE V

A series of preparations was made by mixing 20 gm. samples of yeast with 1.0 ml. of each of a number of commercial and artificial aqueous smoke solutions and then following the procedure described in example I. However, when the aqueous solution were added to the yeast, the yeast caked and became very lumpy. The yeast did not dry rapidly and the lumps hardened so much that it was impossible to break them up to a soft, fluffy powder. Even when the lumps were finely ground, the particles were hard and did not mix intimately when added to the 200 gms. of untreated yeast. Consequently, transfer of the hickory smoke color and flavor to the untreated yeast was not nearly as effective as when the smoke components were dissolved in a volatile solvent.

For ease of handling in the experimental work on this invention small batches of yeast were treated with the hickory smoke preparations and the small batches were then mixed with larger batches. However, the process is not limited to this procedure. If it is more convenient, an adequate quantity of smoke preparation can be added directly to a large batch of yeast powder. The process could also be continuous by metering liquid smoke preparation into yeast powder that is progressing through an auger or other continuous moving device.

This process can be used to impart a desirable hickory smoke flavor and odor to any dry powder used in the preparation of food products or food adjuncts for humans or animals. In the developmental work on this invention, the hickory smoke taste imparted to yeast considerably masked the natural bitter taste of the yeast. This suggests the possibility of using this invention to mask natural off-flavors in food and feed products.

I claim:
1. A process for imparting hickory smoke flavor and color to yeast powder comprising extracting an aqueous solution of hickory smoke with diethyl ether to obtain a diethyl ether solution containing the flavor and color components of the smoke dissolved therein, mixing an appropriate volume of ethanol sufficient to dissolve the smoke components therein with the diethyl ether solution to produce mixed ethanol-diethyl ether solution containing the smoke components, removing the diethyl ether from the mixed ethanol-diethyl ether solution at a sufficiently low temperature and under a blanket of nitrogen to prevent loss of the volatile smoke components, mixing a small amount of the resulting ethanol solution of the smoke components with a batch of yeast powder to impregnate the yeast powder with said smoke components, storing the so-impregnated batch of yeast powder at room temperature until it develops a desirable smoke flavor, and then intimately mixing the resulting batch of yeast powder, impregnated with said smoke components, with a second batch of yeast powder which is ten times heavier thereby to impart a hickory smoke flavor and color to said second batch of yeast powder.

* * * * *